United States Patent
Sawada

(10) Patent No.: US 10,146,343 B2
(45) Date of Patent: Dec. 4, 2018

(54) TERMINAL DEVICE HAVING VIRTUAL OPERATION KEY

(71) Applicant: GungHo Online Entertainment, Inc., Chiyoda-ku (JP)

(72) Inventor: Akira Sawada, Chiyoda-ku (JP)

(73) Assignee: GungHo Online Entertainment, Inc. (JP)

( * ) Notice: Subject to any disclaimer, the term of this patent is extended or adjusted under 35 U.S.C. 154(b) by 122 days.

(21) Appl. No.: 14/618,112

(22) Filed: Feb. 10, 2015

(65) Prior Publication Data

US 2015/0378459 A1  Dec. 31, 2015

(30) Foreign Application Priority Data

Jun. 26, 2014 (JP) ................................. 2014-131850

(51) Int. Cl.
*G06F 3/0481* (2013.01)
*G06F 3/041* (2006.01)
(Continued)

(52) U.S. Cl.
CPC ............ *G06F 3/041* (2013.01); *G06F 3/0481* (2013.01); *G06F 3/0488* (2013.01); *G06F 3/04842* (2013.01); *G06F 3/04845* (2013.01)

(58) Field of Classification Search
None
See application file for complete search history.

(56) References Cited

U.S. PATENT DOCUMENTS

| 2006/0161871 A1* | 7/2006 | Hotelling | G06F 3/0485 715/863 |
| 2010/0017736 A1* | 1/2010 | Kim | G08C 17/02 715/771 |

(Continued)

FOREIGN PATENT DOCUMENTS

| JP | 2011-34538 A | 2/2011 |
| TW | I442274 B | 6/2014 |

OTHER PUBLICATIONS

Extended European Search Report for Application No. EP 14199521.7 dated Oct. 21, 2015 (5 pages).
(Continued)

*Primary Examiner* — William Boddie
*Assistant Examiner* — Bipin Gyawali
(74) *Attorney, Agent, or Firm* — Harness, Dickey & Pierce, P.L.C.

(57) ABSTRACT

The purpose is to provide a terminal device that can be operated by a virtual operation key which is easy to use. The terminal device according to an aspect of the present invention comprises a display unit for displaying a virtual operation key, a touch panel for detecting contact by an inputting object on the virtual operation key, and a control unit for assessing whether a drag operation by the inputting object has been carried out on the basis of contact with the virtual operation key by the inputting object detected via the touch panel and controlling the display position of the virtual operation key, wherein the control unit modifies the display position of the virtual operation key in accordance with the contact position of the inputting object if the contact position of the inputting object exceeds a display area of the virtual operation key due to the drag operation.

20 Claims, 9 Drawing Sheets

(51) Int. Cl.
G06F 3/0488 (2013.01)
G06F 3/0484 (2013.01)

(56) References Cited

U.S. PATENT DOCUMENTS

| | | | | |
|---|---|---|---|---|
| 2010/0088634 | A1* | 4/2010 | Tsuruta | G06F 3/0481 715/800 |
| 2010/0156813 | A1 | 6/2010 | Duarte et al. | |
| 2011/0172013 | A1* | 7/2011 | Shirasaka | G06F 3/0488 463/37 |
| 2011/0285636 | A1* | 11/2011 | Howard | G06F 3/04815 345/173 |
| 2012/0030569 | A1* | 2/2012 | Migos | G06F 3/04845 715/702 |
| 2012/0154311 | A1* | 6/2012 | Iijima | A63F 13/2145 345/173 |
| 2013/0024806 | A1* | 1/2013 | Funabashi | G06F 3/04886 715/781 |
| 2013/0031515 | A1* | 1/2013 | Funabashi | G06F 3/04886 715/863 |
| 2014/0164991 | A1* | 6/2014 | Kim | G06F 3/0481 715/794 |
| 2015/0182856 | A1* | 7/2015 | Mays, III | A63F 13/2145 463/31 |
| 2016/0224234 | A1* | 8/2016 | Sheng | G06F 3/0488 |

OTHER PUBLICATIONS

Taiwanese Office Action for Application No. 103143049, dated Oct. 6, 2017; 11 pages.

* cited by examiner

TERMINAL DEVICE HAVING VIRTUAL OPERATION KEY

CROSS-REFERENCE TO RELATED APPLICATION

This application is based upon and claims priority under 35 U.S.C. § 119 to Japanese Patent Application No. 2014-131850 filed on Jun. 26, 2014, entitled "TERMINAL DEVICE", the entire contents of which are hereby incorporated herein by reference.

FIELD

The disclosed technology relates to a terminal device capable of operating, via a touch panel, a virtual operation key displayed on a display unit.

BACKGROUND

There are conventionally known terminal devices provided with a liquid crystal display or other display and a touch panel disposed so as to cover the display unit, as typified by a smartphone, wherein a directional pad or other virtual operation key such as that used in games is displayed on the display, and the display of other characters displayed on the display can be controlled.

For example, Patent Reference 1 (JP2011-034538, the entire contents of which are hereby incorporated herein by reference) indicates that when an operation button for instructing the direction of movement of a character displayed on the display is displayed and a user makes finger contact at a desired position on the touch panel corresponding to the operation button, a command corresponding to the position is generated to control the movement direction of the character.

PRIOR ART REFERENCES

Patent References

Patent Reference 1: Japanese Laid-open Patent Application No. 2011-034538

SUMMARY

However, in a conventional terminal device, once the display position of the virtual operation key has been determined, the display position of the virtual operation key is fixed during the operation thereof, and it is not necessarily easy to use. If, for example, when executing a game program on the terminal device, a user continuously has their left thumb on the virtually displayed directional pad, the user may inadvertently move their finger from the directional pad due to being absorbed in the progress of the game such as the movement of the character, and the character would unintentionally come to a stop.

In view of the above, the present invention provides, via various embodiments of the present invention, a terminal device that can be operated by a more user-friendly virtual operation key.

A terminal device according to an embodiment of the present invention comprises a display unit for displaying a virtual operation key, a touch panel for detecting contact by an inputting object on the virtual operation key, and a control unit for assessing whether a drag operation by the inputting object has been carried out on the basis of contact with the virtual operation key by the inputting object detected via the touch panel and controlling the display position of the virtual operation key, wherein the control unit modifies the display position of the virtual operation key in accordance with the contact position of the inputting object if the contact position of the inputting object exceeds a display area of the virtual operation key due to the drag operation.

A non-transitory computer-readable medium in which a program stored for causing a computer to function as a control unit for displaying a virtual operation key on a display unit, assessing whether a drag operation by an inputting object has been carried out on the basis of contact with the virtual operation key by the inputting object detected via a touch panel provided to a terminal device, and controlling the display position of the virtual operation key, wherein the control unit modifies the display position of the virtual operation key in accordance with the contact position of the inputting object if the contact position of the inputting object exceeds a display area of the virtual operation key due to the drag operation.

A method for controlling display of a virtual operation key according to an embodiment of the present invention comprises a step for displaying a virtual operation key on a display unit, a step for detecting contact by an inputting object on the display unit via a touch panel, and a step for assessing whether a drag operation by the inputting object has been carried out on the basis of contact with the virtual operation key by the inputting object detected via the touch panel and controlling the display position of the virtual operation key, wherein the display position of the virtual operation key is modified in accordance with the contact position of the inputting object if the contact position of the inputting object exceeds a display area of the virtual operation key due to the drag operation.

There is provided, via various embodiments of the present invention, a terminal device that can be operated by a more user-friendly virtual operation key.

DETAILED DESCRIPTION

Embodiments of the present invention will be described with reference to the appended drawings. The same reference symbols with be used for constituent elements common among the drawings.

Summary of an Embodiment of the Present Invention

A terminal device 100 (mobile telephone, smartphone, mobile game machine, mobile information terminal, PDA, wireless controller terminal, desktop personal computer, laptop personal computer, arcade game terminal or the like installed in a game arcade, and the like) having a touch panel capable of executing a program according to the present embodiment will be described in detail as an example of the terminal device according to an embodiment of the present invention.

Figure 1:
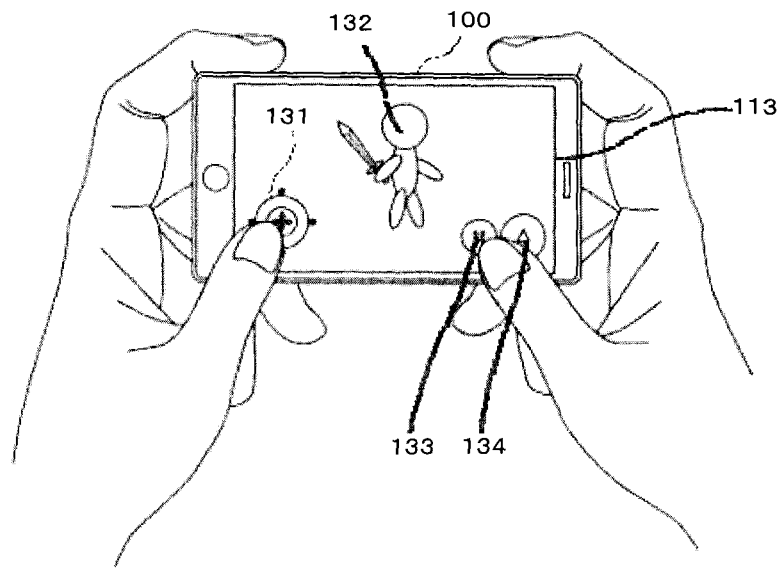
FIG. 1 shows the state of usage by a user of the terminal device according to an embodiment of the present invention.

FIG. 1 shows the state of usage by a user of the terminal device 100 according to an embodiment of the present invention. In FIG. 1, the user is using the terminal device 100 in landscape orientation and is grasping the two ends thereof with the left and right hands. A "virtual joystick" 131 that virtually imitates a joystick, or a movable object 132 is displayed on a display unit 113 when the program according to the present embodiment is executed by the control unit 110. The virtual joystick 131 is operated by, e.g., the left thumb via the touch panel to control the movement of the displayed movable object 132. A virtual operation button A133 and/or a virtual operation button B134 is operated by the right thumb via the touch panel to control the display of a weapon held by the movable object 132. In addition to people, animals, monsters, and other characters, the movable object 132 may also include all objects that move in an imaginary space during execution of a program.

In the present embodiment, an example is described in which a finger is used as an inputting object and contact by the finger is detected by a touch panel, but there is no limitation to using a finger as an inputting object. A stylus pen or other known inputting objects suited to various schemes may be used in accordance with the touch panel scheme to be used.

The program according to the present embodiment is exemplified by a game program, but no limitation is imposed thereby. Any program requiring operation by a virtual operation key such as that shown in FIG. 1 may be used. Such a program is stored in advance in a memory unit 114 of the terminal device 100, but it is also possible to receive the program from a server (not shown) via a communication processing unit 111. Also, the program may be stored in a predetermined cartridge to be connected to the terminal device 100 via a connector 124, whereupon the control unit 110 may read out the program from the cartridge. It is furthermore possible to store the program on a server and then download and execute the program in the terminal device 100 in similar fashion to a program referred to as a "native app."

Furthermore, in the present embodiment, a description is provided for the case in which the program is executed in the control unit 110 of the terminal device 100, but it is also possible to store the program in an external server, to carry out processing by the program in the server in accordance with instructions/commands transmitted from the terminal device 100 in accordance with the progress of the program, and then to transmit the results to the terminal device 100 in similar fashion to a program referred to as a web app to thereby implement the display according to the present embodiment.

Figure 2:
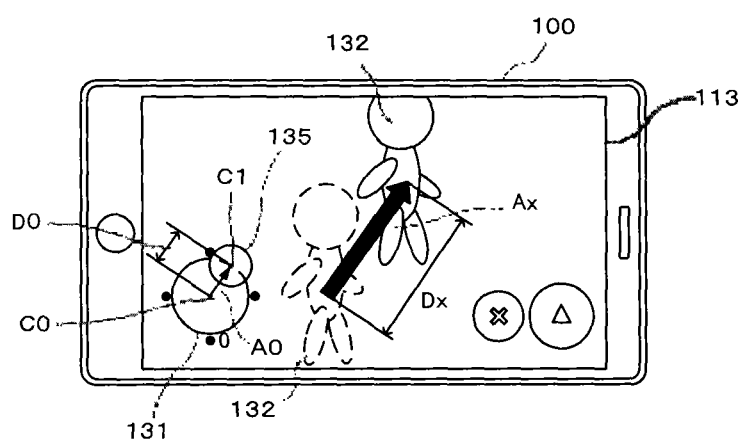
FIG. 2 shows an example of a screen displayed on the display unit of the terminal device according to an embodiment of the present invention.

FIG. 2 shows an example of a screen displayed on the display unit of the terminal device according to an embodiment of the present invention, and shows a state in which the user is operating the virtual joystick 131. The virtual joystick 131 functioning as a virtual operation key is displayed on the display unit 113 of the terminal device 100 in a fixed position determined in advance. The virtual joystick 131 is formed as a circle around a reference position C0. An operative object 135 formed as a circle around a contact position C1 of the user's finger is displayed on the display unit 113 in order to explicitly ascertain the position on the display unit 113 contacted by the user's finger.

The virtual joystick 131 and operative object 135 to be displayed in the present embodiment are displayed semi-transparently, and the movable object 132 can be visually confirmed even when, e.g., the display is superimposed on the movable object 132.

FIG. 2 shows a state in which the user has made finger-contact with a desired position on the virtual joystick 131, and has thereafter dragged the finger in a desired direction to move to the position of contact position C1. A direction A0 of the contact position C1 as viewed from the reference position C0 is determined from the coordinate value of the reference position C0 and the coordinate value of the contact position C1 and the distance D0 between the two positions is determined. A movement direction Ax and a movement distance Dx of the display position of the movable object 132 are determined on the basis of the direction A0 and the distance D0 thus determined. As a result, the movable object 132 is moved by the distance Dx in the direction Ax determined from the initially displayed position (in the drawing, the position of the movable object 132 indicated by a broken line), and then displayed.

In the present embodiment, The virtual joystick 131 and operative object 135 are displayed semitransparently as described above, but the virtual joystick 131 and the operative object 135 are not necessarily required to be constantly displayed. Although not particularly shown in the drawings, as an example, these objects may be displayed from the initial time at which the inputting object makes contact with the touch panel 116. The area corresponding to the virtual joystick 131 and the operative object 135 may be provided in an imaginary fashion in a corresponding position of the touch panel without these objects being explicitly displayed on the display unit 113.

<Terminal Device>

Figure 3:
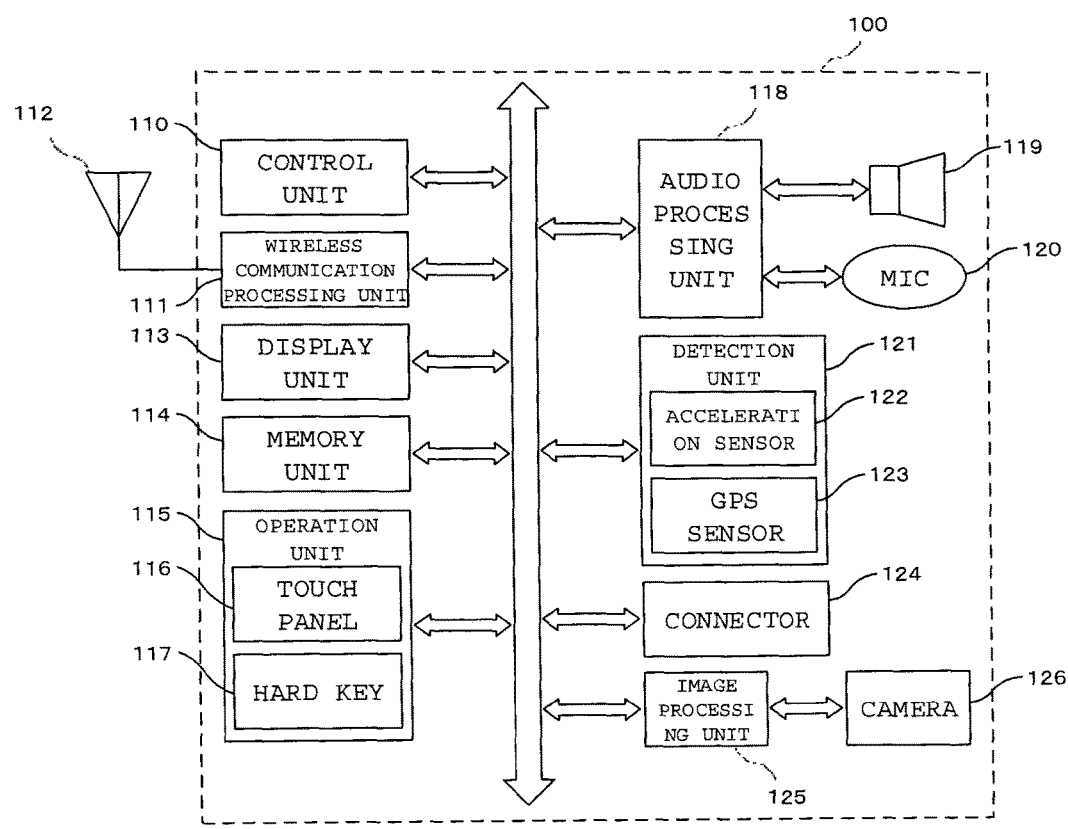
FIG. 3 is a block view showing a configuration of the terminal device according to an embodiment of the present invention.

FIG. 3 is a block view showing a configuration of the terminal device 100 according to an embodiment of the present invention. The terminal device 100 according to the present embodiment is not required to be provided with all the constituent elements shown in FIG. 3, and it is also possible to omit a portion thereof from the configuration.

The terminal device 100 according to an embodiment of the present invention comprises a control unit 110, a wireless communication processing unit 111 connected to an antenna 112, a display unit 113, a memory unit 114, an operation unit 115 comprising a touch panel 116 and a hard key 117, an audio processing unit 118 connected to a speaker 119 and a microphone 120, a detection unit 121 comprising an acceleration sensor 122 and/or a GPS sensor 123, a connector 124, and an image processing unit 125 connected to a camera 126. These constituent elements are electrically connected to each other via a control line and a data line.

The control unit 110 is composed of a CPU (microcomputer) and controls the display of various image information stored in the memory unit 114 to the display unit 113 on the basis of coordinate information inputted by contact on the touch panel 116. The control unit 110 reads out from the memory unit 114 the program according to the present embodiment stored in the memory unit 114, and controls the progress of the application according to the present embodiment. In other words, the control unit 110 controls the other connected constituent elements on the basis of various programs stored in the memory unit 114.

The control unit 110 may be composed of one or more CPUs. It is also possible to separately provide image processing, i.e., a GPU specialized for display control of the display unit 113.

The wireless communication processing unit 111 performs modulation, demodulation, and various other processes for transmitting information stored in the memory unit 114 to another remotely established terminal and for receiving information transmitted from another terminal, via a connected wireless communication antenna 112. For example, when the program according to the present embodiment is to be received from a server, the wireless communication processing unit 111 controls receiving from the server or the like in a single process at the start of execution or in a progressive manner in accordance with the progress of processing, and also controls transmission of various processing or results obtained by execution of the program to the server.

The wireless communication processing unit 111 carries out processing on the basis of a wideband wireless communication scheme typified by wideband-code division multiple access (W-CDMA), but it is also possible to carry out processing on the basis of a scheme related to narrowband wireless communication such as wireless LAN or Bluetooth (registered trademark) as typified by IEEE 802.11.

The display unit 113 displays, on the basis of, e.g., image information stored in the memory unit 114, a movable object, a virtual joystick, or another virtual operation key indicated by the control unit for executing a predetermined program. The display unit is composed of, e.g., a liquid crystal display. The terminal device according to the present embodiment is provided with a single display unit, but it is also possible to provide two or more display units.

The memory unit 114 is composed of ROM, RAM, nonvolatile memory, or the like. ROM is, e.g., memory for storing the program according to the present embodiment. The control unit 110 loads the program to execute various processing. RAM is memory used for reading and writing data while various commands generated by executing the program stored in ROM are being processed by the control unit 110. The nonvolatile memory is used for reading and writing of data by execution of the program, and the data written therein is saved even after execution of the program has ended.

The operation unit 115 is composed of a touch panel 116, a hard key 117, and the like, and receives various instructions from the user.

The touch panel 116 is disposed so as to cover the display unit 113 and is used for outputting to the control unit 110 position coordinate data corresponding to image data to be displayed on the display unit 113. Touch panel schemes that may be used include a resistive film scheme, a capacitive coupling scheme, an ultrasonic surface acoustic wave scheme, and other known schemes. Contact with the touch panel by a finger, a stylus pen, or other known inputting object is detected in accordance with the scheme to be used.

The hard key 117 controls signal on/off by the physical pressing of a switch and is composed of a power source key, a volume key, or the like. A hard key 117 such as noted above controls the terminal device power source on/off, the volume of background music during program execution, or other control. In addition to a virtual operation key, it is also possible to provide various keys to be used in a game.

The detection unit 121 is composed of an acceleration sensor 122 and/or a GPS sensor 123. The acceleration sensor detects the acceleration of the terminal device 100 in three axial directions to detect, e.g., the rotation of the terminal device 100.

The connector 124 accepts insertion of a cartridge or storage medium in which, e.g., the program according the present embodiment is stored, and mediates reading and writing by the control unit 110. A terminal unit for outputting image information to, e.g., a liquid crystal television or other external display device may also be included.

The audio processing unit 118 encodes audio information inputted from the microphone 120 for storage in the memory unit 114. The audio processing unit 118 decodes and outputs background music and other audio information stored in the memory unit 114 from the speaker 119.

The image processing unit 125 is connected to the camera 126, converts images taken by the camera 126 to a data format suitable for storage, and stores the images in the memory unit 114.

<Summary of Operating the Virtual Joystick>

Figure 4:
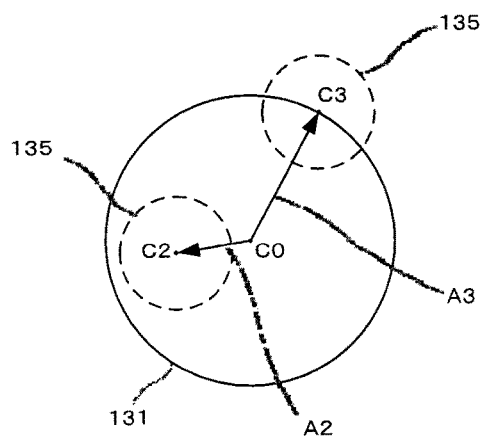
FIG. 4 illustrates the method for determining the distance and direction of a contact position in a virtual joystick 131 as viewed from a reference position.

FIG. 4 illustrates the method for determining the distance and direction of the contact position in a virtual joystick 131 as viewed from the reference position.

FIG. 4 shows the relationship between the virtual joystick 131 displayed on the display unit 113 and the contact position of the inputting object. First, the virtual joystick 131 is formed as a circle around the reference position C0. The initial display position of the virtual joystick 131 is determined in advance to be a desired coordinate position on the display unit 113, and a circle showing the virtual joystick 131 is displayed on the coordinate position together with execution of the program. The display unit coordinate system is correlated so as to match the touch panel coordinate system.

In the present embodiment, the reference position serves as a reference when the direction and distance of the contact position of the inputting object on the touch panel is to be determined, and is the center (point C0) of the circle forming the virtual joystick 131. The reference position is not necessarily required to be the center (median point) of the operation key when, e.g., the virtual operation key is not formed as a circle, as long as the reference position can be a reference used when determining the direction and distance of the contact position as noted above. Since the reference position can be used as a reference, the reference position may be any position determined in advance.

The user brings his/her finger into contact with any position inside the virtual joystick 131 displayed in advance on the display unit 113, and drags the inner part of the virtual joystick 131 in any direction to move the contact position. At this time, the touch panel 116 detects the position coordinate of the contact position during or after movement, and reports the position coordinate to the control unit 110. In FIG. 4, the position coordinate (X2, Y2) of the contact position C2 or the position coordinate (X3, Y3) of the contact position C3 is reported to the control unit 110 as the contact position of the finger during or after a drag operation.

The control unit 110 determines the length and angle formed by line segments A2 and A3 formed by the position coordinate (X0, Y0) of the reference position C0 determined in advance, the acquired position coordinate (X2, Y2) of the contact position C2 or the position coordinate (X3, Y3) of the contact position C3. By "angle" is meant the direction of the contact positions C2 and C3 as viewed from the reference position C0. By "length" is meant the distance between the reference position C0 and the contact positions C2 and C3.

The angle (direction) and length (distance) can be determined using a known method. Following is an example. Using the line segment A2 as an example, first, the angle (direction) is calculated with the following formula (formula 1) using the length L2 of the line segment A2 and the angle θ2 formed by the line segment A2 with respect to X-axis in an imaginary XY coordinate system in which the reference position C0 is the origin.
[Formula 1]
Angle θ2 formed by the line segment A2 formed by the reference position and the contact position:

$$\cos\theta 2 = (X2-X0)/L2$$

where L2 is the length of the line segment
Length L2 of the line segment A2 formed between the reference position and the contact position:

$$L2 = \sqrt{(X2-X0)^2 + (Y2-Y0)^2}$$

A table is stored in the memory unit 114, the table containing the angle and length of the line segments A2 and A3 formed by the position coordinate (X0, Y0) of the reference position C0, the position coordinate (X2, Y2) of the contact position C2 or the position coordinate (X3, Y3) of the contact position C3, in other words, the direction of the contact positions C2 and C3 as viewed from the reference position C0 and the distance between the reference position C0 and the contact positions C2 and C3, and also containing the correspondence between the movement direction and movement distance of the movable object 132. The control unit 110 determines the movement direction and movement distance of the movable object 132 from the determined direction of the contact positions C2 and C3 as viewed from the reference position C0 and the distance between the reference position C0 and the contact positions C2 and C3, and controls displaying of the movable object in accordance therewith.

A table was used in the example described above, but it is also possible to store a predetermined relational expression and determine the movement direction and movement distance of the movable object on the basis thereof, and the determination method may be any known method. The method for determining the movement distance of the movable object may be, e.g., speed during movement or distance moved, and may be selected, as appropriate.

Figure 5:
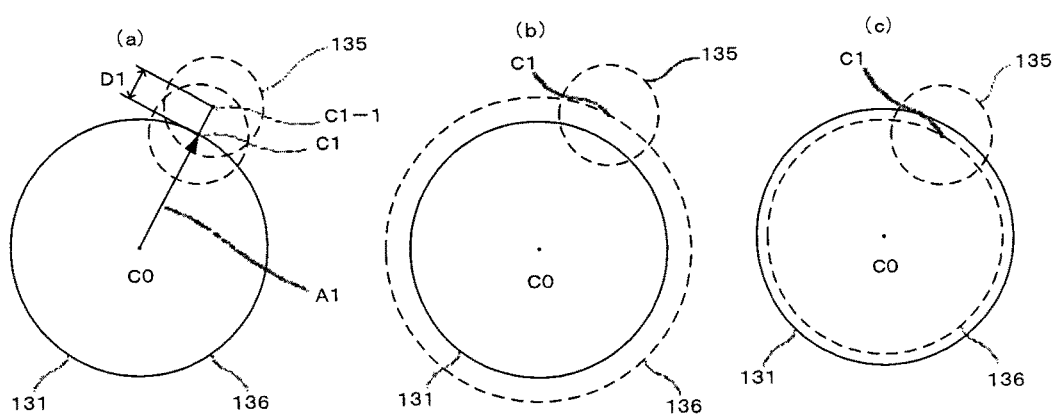
FIG. 5 illustrates a method for controlling display of the virtual joystick 131.

FIG. 5 illustrates the method for controlling display of the virtual joystick 131. First, in the virtual joystick 131 according to the present embodiment, an operation detection area 136 is set in advance on the touch panel 116 in correspondence with the display area of the virtual joystick 131. The operation detection area 136 is used by the control unit to recognize a contact operation by the inputting object in the operation detection area as an operation on the virtual joystick 131.

FIG. 5(a) shows the case in which the same area as the display area of the virtual joystick 131 formed as a circle is set as the operation detection area 136. The operation detection area 136 and the display area of the virtual joystick 131 are perfectly identical corresponding areas. The contact position C1 shows the position where the user has operated the inputting object, dragged the virtual joystick 131, and moved the inputting object. When the user operates and furthermore drags the inputting object away from the reference position C0, which is the center of the virtual joystick 131, the contact position C1 of the inputting object exceeds the display area of the virtual joystick 131, i.e., the operation detection area 136.

At this time, the control unit 110 controls the display position of the virtual joystick 131 so that the display position is modified in accordance with the exceeded contact position C1 of the inputting object. In other words, the control unit 110 controls the virtual joystick 131 so as to be displayed tracking in the inputting object movement direction. For example, the control unit 110 begins moving the display position of the virtual joystick 131 when the contact position C1 of the inputting object has exceeded the display area of the virtual joystick 131 by a predetermined distance D1. The control unit then performs tracking display control of the virtual joystick 131 so that the distance between the outer periphery of the display area of the virtual joystick 131 and C1-1, which is the contact position of the inputting object, is maintained at the distance D1. In other words, the control unit 110 controls displaying so that the position C1-1, which is the contact position of the inputting object and the center of the circle forming the operative object 135, is positioned on the outer side of the display area of the virtual joystick 131, i.e., the circle forming the virtual joystick 131 when the contact position of the inputting object has exceeded the display area of the virtual joystick 131 due to a drag operation by the inputting object.

Providing the distance D1 to tracking display in this manner makes it possible to provide the user with a trailing perception rather than the perception that the display area of the virtual joystick 131 itself is being moved.

In the above case, the contact position of the inputting object is actually C1-1. In such a case, the angle and length of the line segment A1, which is determined on the basis of the reference position C0 and the contact position of the inputting object, is determined on the basis of the reference position C0 and the position at which the line segment connecting the reference position C0 and the contact position C1-1 intersects the outer periphery of the display area of the virtual joystick 131.

FIGS. 5(b) and 5(c) show another example of the control of the display of the virtual joystick 131. In FIG. 5(b), the display area of the operation detection area 136 is set in advance to be slightly greater than the display area of the virtual joystick 131. In such a case, even were the contact position of the inputting object to be outside of the display area of the virtual joystick 131, the contact can be recognized to be an operation on the virtual joystick 131. Also, the control unit 110 does not immediately cause the display of the virtual joystick 131 to be tracked even when contact position C1 of the inputting object exceeds the display area of the virtual joystick 131, but does start tracking display control for modifying the display position of the virtual joystick 131 in accordance with the contact position C1 of the inputting object once the operation detection area 136 has been exceeded. Since some drift in the target position can be accommodated when the user contacts the operation key with the inputting object, operability by user is further improved. Also, in the same manner as FIG. 5(a), providing "play" in the time and distance to tracking display further improves operability by the user after the drag operation has started.

In FIG. 5(c), an area smaller than the display area of the virtual joystick 131 is set in advance. In such a case, the control unit 110 starts tracking of the virtual joystick 131 at the point when the operation detection area 136 has been exceeded as a result of the drag operation of the inputting object. In other words, tracking display is started even though the contact position of the inputting object is in the display area of the virtual joystick 131. Doing so makes it possible to achieve a reliable perception that contact is constant because the contact position of the inputting object by the user is never away from the display area of the virtual joystick.

This tracking display control of the virtual joystick 131 to the contact position can be used in any of the modes shown in FIGS. 5(a) to 5(c), and can be set, as appropriate.

Figure 6:
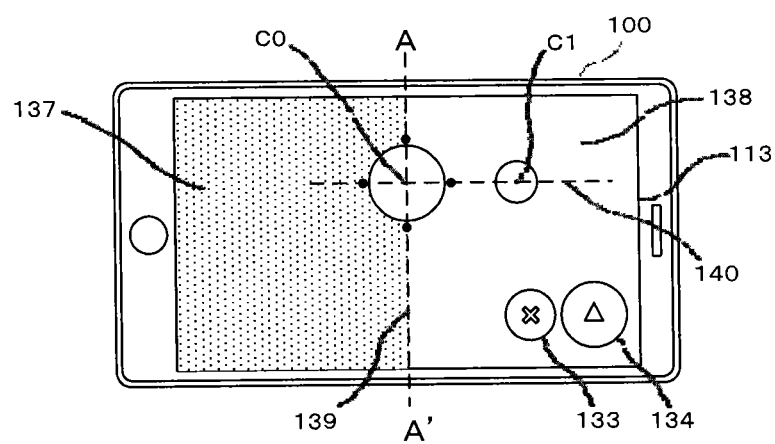
FIG. 6 illustrates a method for controlling display of the virtual joystick 131.

FIG. 6 illustrates the method for controlling display of the virtual joystick 131. In the present embodiment, the virtual operation button A133 and/or the virtual operation button B134 is displayed on the right side of the display unit 113. When the drag operation by the inputting object exceeds the display area of the virtual joystick 131 or the operation detection area 136 and thereby causes the virtual joystick 131 to be displayed so as to track the contact position of the inputting object, the control unit 110 causes the display unit to perform a display such that tracking display is temporarily stopped when the display position of the virtual joystick 131 exceeds the predetermined area.

In the specific case that the display unit 113 has been divided into a right area and a left area about the center (line A-A') of the display unit 113, the area in which the virtual joystick 131 is displayed (the right-side area in FIG. 6) is set as a movement-allowed area 137. In other words, in FIG. 6, the area on the side in which a fixed position determined in advance is present is set as the movement-allowed area 137, the fixed position being the position in which the virtual joystick 131 is displayed prior to the start of operation of the virtual joystick 131. The movement-allowed area 137 is an area determined in advance for moving (tracking display) the display position of the virtual joystick 131 when the display position of the virtual joystick 131 is in the movement-allowed area, and displaying the virtual joystick 131 so as to stop on the boundary between the movement-allowed area of the display unit 113 and other areas when the area has been exceeded. In other words, an area divided in half about the center of the display unit 113 is not necessarily required to be set as the movement-allowed area 137 as long as the area is greater than the display area of the virtual joystick 131 and the operation detection area 136. For example, the area can be modified, as appropriate, in accordance with the arrangement of other virtual keys or the arrangement of the movable object to be displayed. When the user's finger is used as the inputting object, the movement-allowed area 137 can be set in a range that allows the finger as an inputting object to make relative contact while the terminal device is being grasped.

In FIG. 6, when the display position of the virtual joystick 131 (e.g., the reference position C0 inside the virtual joystick 131) exceeds the movement-allowed area 137 as a result of the tracking display of the virtual joystick 131 being controlled, the virtual joystick 131 is displayed so as to stop on the boundary 139 between the movement-allowed area 137 and other areas 138 of the display unit. In the example of FIG. 6, the virtual joystick 131 is displayed so as to stop at the position where the boundary 139 intersects the line 140 parallel to the outer periphery of the display unit 113 which passes through the contact position C1 of the inputting object. Therefore, when the inputting object is dragged up or down inside the other areas 138, the virtual joystick 131 is displayed so as to move up or down along the boundary line.

FIG. 6 shows an example in which the virtual joystick 131 is displayed so as to stop on the boundary 139 when the display position of the virtual joystick 131 exceeds the movement-allowed area 137 as a result of the tracking display of the virtual joystick 131 being controlled, but no limitation is imposed thereby. For example, in a case such as the above, the control unit 110 may also control the display so that the display position of the virtual joystick returns to a predetermined fixed position where the virtual joystick 131 was originally displayed.

<Virtual Joystick Control Flow>

Figure 7:
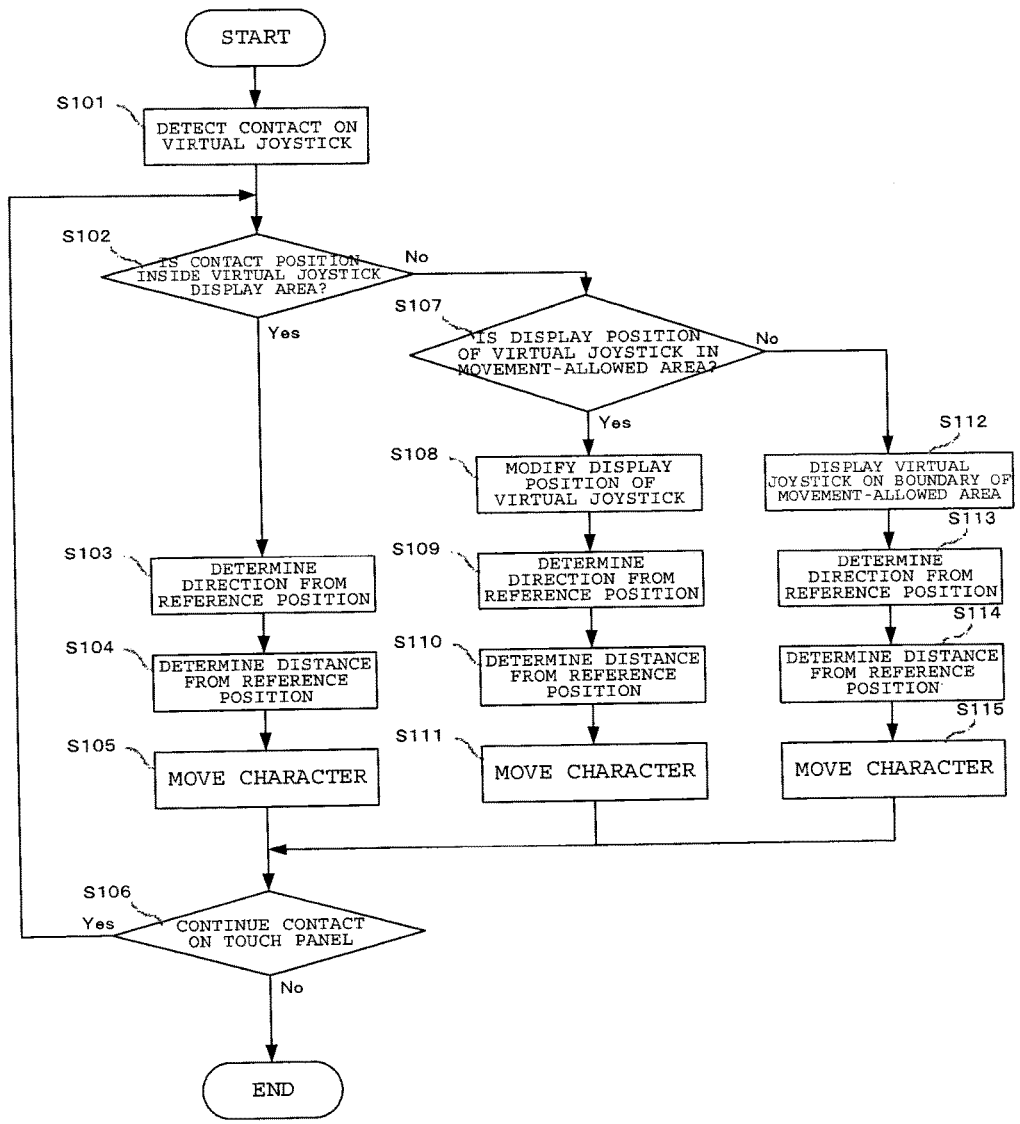
FIG. 7 is a flowchart of the flow of processing carried out in the control unit 110 of the terminal device 100.

FIG. 7 is a flowchart showing the flow of processing carried out in the control unit 110 of the terminal device 100 by execution of the program according to the present invention. The processing flow is started when the control unit 110 executes the program according to the present embodiment stored in the memory unit 114. Contact by the user's inputting object on the virtual joystick 131 is detected via the touch panel 116 (S101). The control unit 110 next assesses whether the contact position is still inside the display area of the virtual joystick 131 (S102). As illustrated in FIG. 5, it is also possible to use the operation detection area 136 in place of the display area of the virtual joystick 131 as a reference for assessment in S102.

When the contact position of the inputting object has been assessed to be inside the virtual joystick in S102, the direction of the contact position as viewed from the reference position and the distance between the reference position and the contact position are determined on the basis of the contact position and the reference position set inside the virtual joystick (S103 and S104). The control unit 110 then, on the basis of the direction and distance thus determined, determines the movement direction and movement distance of the movable object displayed on the display unit 113 from a reference table stored in the memory unit 114 and controls the movement display of the movable object (S105).

Next, it is subsequently assessed whether contact by the inputting object on the touch panel is continuous, i.e., whether a drag operation is being carried out (S106). As a result, when it is assessed that contact is continuous and that a drag operation is being carried out, the process returns again to S102, and assesses whether there is a contact position inside the display area of the virtual joystick 131 on the basis of the contact position after the drag operation.

In S102, the process proceeds to S107 when it has been assessed that the contact position is not inside the display area of the virtual joystick 131, i.e., when the contact position of the inputting object has exceeded the display area of the virtual joystick 131 due to a drag operation.

Next, in S107, the control unit 110 assesses whether the display position of the virtual joystick 131 is inside the movement-allowed area 137 (S107). When the contact position is assessed to still be inside the movement-allowed area 137, the control unit 110 modifies the display position of the virtual joystick 131 in accordance with the contact position (S108). In other words, the control unit 110 controls display so that the virtual joystick 131 follows to the contact position.

Next, in S109 and S110, the direction of the contact position as viewed from the reference position and the distance between the contact position and the reference position is determined on the basis of the contact position of the inputting object and the reference position provided inside the virtual joystick. The contact position is used for determining distance, but the distance may also be determined on the basis of the reference position and the position at which the line determined on the basis of the reference position and the contact position of the inputting object intersects the outer periphery of the display area of the virtual joystick 131.

On the basis of the direction and the distance thus determined, the control unit 110 determines the movement direction and movement distance of the movable object displayed on the display unit 113 from the reference table stored in the memory unit 114, and controls the movement and display of the movable object (S111).

In S106, the control unit 110 assesses whether contact by the inputting object on the touch panel is continuous, i.e., whether a drag operation is being carried out (S106). As a result, the control unit 110 returns to S102 when it has been assessed that a drag operation is continuing. At this point, in the same manner as above, the process proceeds to S107 when the control unit 110 has assessed that the display area of the virtual joystick 131 has been exceeded.

In S107, the control unit 110 assesses whether the display position of the virtual joystick 131 is within the movement-allowed area 137 (S107), and the process carried out by the control unit 110 proceeds to S112 when the display position has been assessed to have exceeded the movement-allowed area.

In S112, the control unit 110 modifies the display position of the virtual joystick 131 to be on the boundary 139 between the movement-allowed area 137 and the other areas 138 of the display unit 113. In S113 and S114, the direction of the contact position as viewed from the reference position and the distance between the contact position and the reference position is determined on the basis of the contact position of the inputting object and the reference position provided inside the virtual joystick. In this case, the contact position is used for determining distance, but in lieu of the contact position, it is preferred that the distance be determined on the basis of the reference position and the position at which the line determined on the basis of the reference position and the contact position of the inputting object intersects the outer periphery of the display area of the virtual joystick 131.

On the basis of the direction and the distance thus determined, the control unit 110 determines the movement direction and movement distance of the movable object displayed on the display unit 113 from the reference table stored in the memory unit 114, and controls the movement and display of the movable object (S115).

Returning again to S106, it is assessed whether contact by the inputting object on the touch panel is continuous, i.e., whether a drag operation is being carried out. When it has been assessed in S106 that the inputting object has been separated from the touch panel, the processing flow ends.

<Screen Transition>

Figure 8:
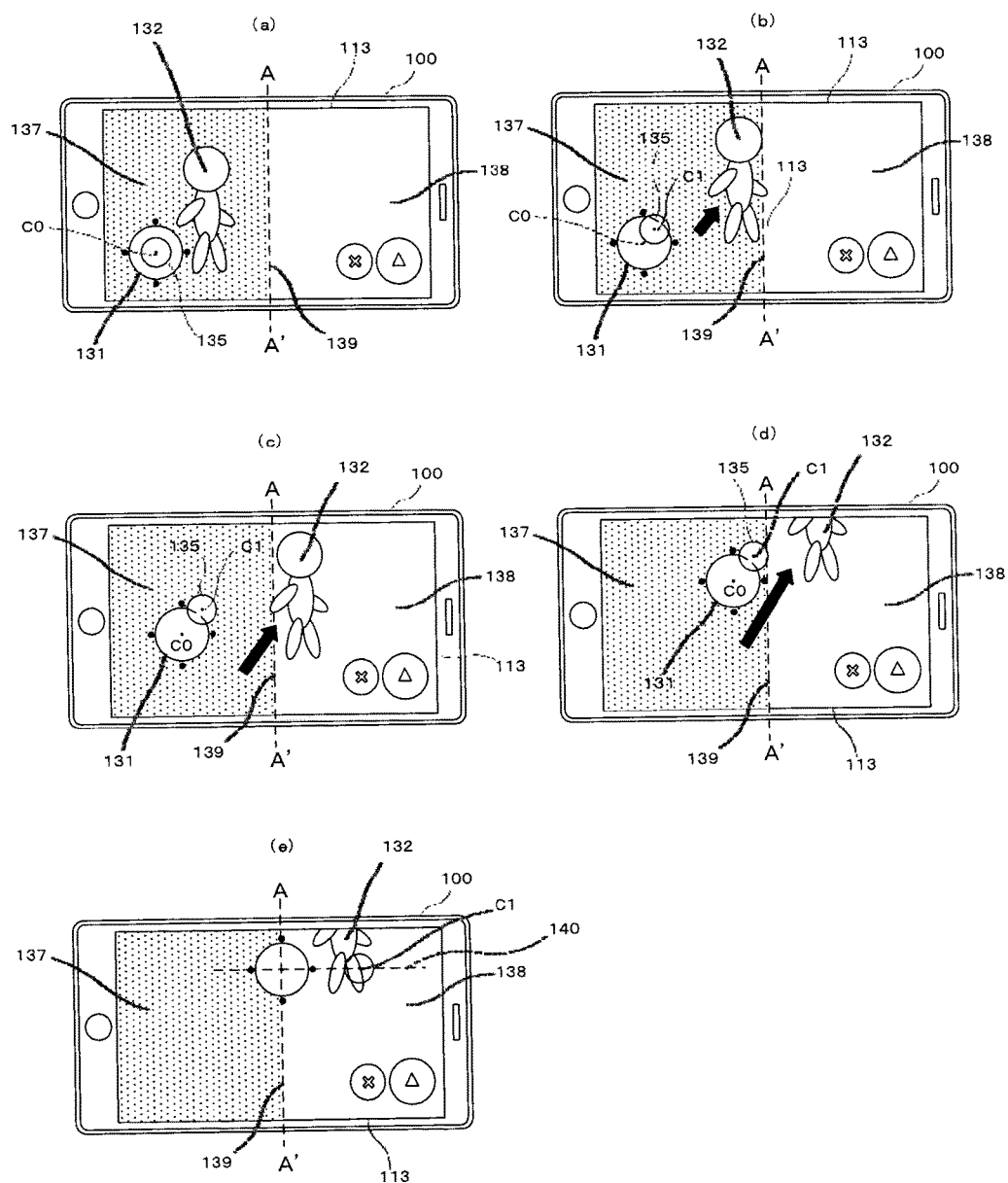
FIG. 8 is a schematic view of a screen example brought about by executing the program according to the present embodiment.

FIG. 8 is a schematic view of a screen example brought about by execution of the program according to the present embodiment. Referring to FIG. 8($a$), the control unit 110 of the terminal device 100 starts execution of the program according to the present embodiment, and the virtual joystick 131 and movable object 132 are then displayed in a predetermined fixed position of the display unit 113. In addition to people, animals, monsters, and other characters, the movable object 132 may also include weapons, rocks, and all other objects that move in an imaginary space during execution of a program.

Further referring to FIG. 8($a$), the operative object 135 for explicitly ascertaining the position on the touch panel 116 contacted by the user's finger is displayed on the display unit 113. The operative object 135 moves display position together with the movement of the inputting object so that the touch position made by the inputting object is in the center of the operative object 135.

In FIG. 8($a$), since the user has not carried out a contact operation on the touch panel 116 using the inputting object, the virtual joystick 131 and the movable object 132 are both displayed in a fixed position determined in advance. Specifically, the reference position C0 of the virtual joystick 131 and the center of the operative object 135 indicating the contact position are display so as to be superimposed on each other.

FIG. 8($b$) is a schematic view of a screen example of when the user is carrying out a drag operation on the virtual joystick 131 using the inputting object when the display shown in FIG. 8($a$) is being performed. Referring to FIG. 8($b$), contact is made by the inputting object in the position of the contact position C1, whereby the display position is moved together with the operative object 135. The direction of the contact position C1 and the distance to the contact position C1 are determined on the basis of the reference position C0 and the contact position C1, and the display position of the movable object 132 is moved on the basis of the direction and distance thus determined using the determined direction and distance. At this time, the contact position of the inputting object has not exceeded the display area of the virtual joystick 131, and the control unit 110 therefore performs control so that the display position of the virtual joystick 131 is in a fixed position and does not perform tracking control for the display position.

FIG. 8($c$) is a schematic view of a screen example of when the user is carrying out a drag operation on the virtual joystick 131 using the inputting object when the display shown in FIG. 8($a$) is being performed, and the contact position has exceeded the display area of the virtual joystick 131. In this example, the determination as to whether to perform control for tracking display of the virtual joystick 131 is made based on the display area thereof, but it is also possible to use the operation detection area 136. Referring to FIG. 8($c$), control for tracking display of the virtual joystick 131 is being carried out, and the display area of the virtual joystick 131 is therefore moving together with the movement of the contact position. The direction of the contact position C1 and the distance to the contact position C1 are determined on the basis of the reference position C0 and the contact position C1, and the display position of the movable object 132 is being moved on the basis of the direction and distance thus determined using the determined direction and distance.

In similar fashion to FIG. 8(c), FIG. 8(d) is a schematic view of a screen example of when the user is carrying out a drag operation on the virtual joystick 131 using the inputting object when the display shown in FIG. 8(a) is being performed, and the contact position has exceeded the display area of the virtual joystick 131. As illustrated in FIG. 8(c), control of tracking display of the virtual joystick 131 is being carried out. Also, the movable object 132 is moving a greater distance than the case of FIG. 8(c) together with the passage of operation time on the virtual operative object 131, which was in a fixed position.

In similar fashion to FIGS. 8(c) and 8(d), FIG. 8(e) is a schematic view of a screen example of when the user is carrying out a drag operation on the virtual joystick 131 using the inputting object when the display shown in FIG. 8(a) is being performed, and the contact position has exceeded the display area of the virtual joystick 131. At this point, in the example of FIG. 8(e), the display unit 113 is divided into a left area and a right area about center (line A-A') of the display unit 113 and the area in which the virtual joystick 131 is being displayed (the left-side area in FIG. 6) is set as the movement-allowed area 137. The contact position C1 indicating the contact position of the inputting object has exceeded the movement-allowed area 137 and the display position of the virtual joystick 131 (specifically, the reference position C0) is about to exceed the movement-allowed area 137. Therefore, the virtual operative object 131 is displayed so that the reference position C0 comes onto the boundary 139 between the movement-allowed area 137 and the other areas 138. At this point, the reference position C0 is made to stop on the boundary line, but as shall be apparent, it is also possible for the reference position to be displayed so as to stop on the boundary line when the outer periphery of the display area of the virtual joystick 131 nearest to the boundary 139 has exceeded the movement-allowed area 137.

As described above, in the present embodiment, the display position of the virtual joystick 131 moves, i.e., tracking display is carried out, on the basis of the contact position when the contact position of the inputting object has exceeded the virtual joystick 131 or the operation detection area 136, and it is possible to prevent the inconvenience of the position of the finger as the inputting object from unknowingly moving from the virtual joystick 131 due to the user concentrating on, e.g., the movement of the character or other movable object being moved. Since the display position of the virtual operative object 131 is displayed so as to stop on the boundary between the movement-allowed area 137 and the other areas 138 when the movement-allowed area 137 has been exceeded, tracking control within a range in which input is relatively possible is carried out from the position of the finger as the inputting object, and operation that is not uncomfortable to the user can be carried out.

Other Embodiments of the Present Invention

Other embodiments of the present invention will be described. A description of the portions that achieve the same function as the terminal device 100 according to the embodiment described above will be omitted. The embodiment described above and other embodiments described below can be combined wholly or in part, as appropriate.
1. Display Position of the Virtual Joystick 131

In the embodiment described above, the case was described in which, when the program according to the embodiment described above is executed, the virtual joystick 131 is displayed in a fixed position determined in advance, and the inputting object contacts the virtual operative object 131 to thereby start processing. However, in lieu thereof, it is also possible to start processing by bringing the inputting object into contact with the touch panel in any position.

Figure 9:
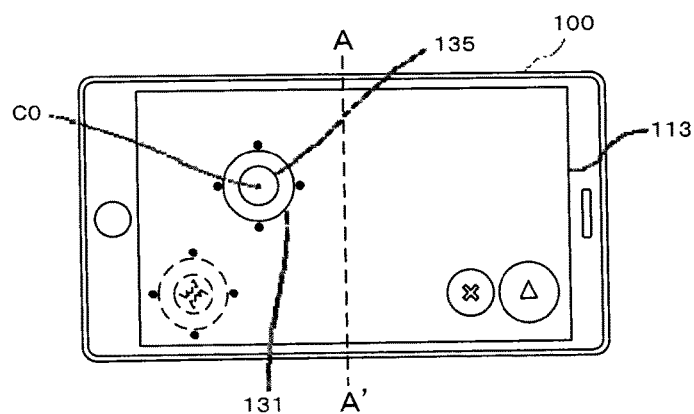
FIG. 9 is a schematic view of a screen example according to another embodiment showing the display position of the virtual joystick 131.

As a specific example thereof, FIG. 9 is a schematic view of a screen example according to another embodiment showing the display position of the virtual joystick 131. Referring to FIG. 9, the virtual joystick 131 is displayed in a fixed position by execution of the program (indicated by a broken like in FIG. 9). When contact is thereafter made by the inputting object in a desired position, the virtual joystick 131 is moved to a display position about the reference position C0 using the contact position as the reference position C0. Control for displaying the movable object using the virtual joystick 131 in the position after movement and control for tracking display of the virtual operative object 131 are carried out. The specific processing flow and the like are the same as that carried out in the embodiment described above.

Setting the display position in this manner makes it possible to further improve user convenience.
2. Control when the Terminal Device 100 is Used in a Portrait Orientation.

The terminal device 100 according to the present embodiment is provided with an acceleration sensor 122. The rotation of the terminal device 100 can be detected by a known method using the acceleration sensor 122. Described in the embodiment above is the case in which the terminal device 100 is used in the landscape direction, but the display of the display unit 113 is switched when the user repositions the terminal device 100 in portrait orientation and the rotation of the terminal device 100 is detected by the acceleration sensor 122 in the present embodiment.

Figure 10:
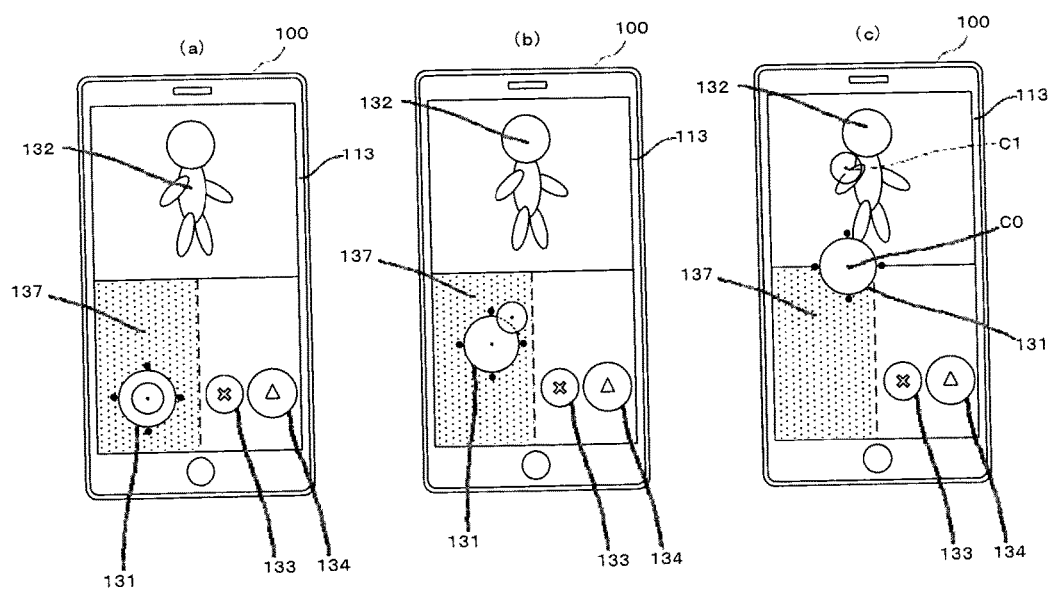
FIG. 10 is a schematic view of a screen example of when the terminal device 100 is used in portrait orientation.

As a specific example thereof, FIG. 10 is a schematic view of a screen example of when the terminal device 100 is used in portrait orientation. Referring to FIG. 10(a), the movable object 132 or the like displayed in accompaniment with the progress of the program is displayed in the upper part of the display unit 113 and the virtual operation keys, i.e., the virtual joystick 131, the virtual operation button A133, and the virtual operation button B134 are displayed in the lower part. In other words, when the terminal device 100 is used in the landscape orientation, the virtual joystick 131 and other virtual operation keys are superimposed and displayed on the display object, which may change at any time together with the progress of the program, but when the terminal device 100 is used in portrait orientation, the display is controlled so that the virtual operation keys are displayed in different display area.

FIG. 10(b) is a schematic view of a screen example in which display control is performed through tracking of the virtual joystick 131 in the contact position by the inputting object. The tracking display control method is the same as the tracking display described in the embodiment above.

FIG. 10(c) is a schematic view of a screen example of when the contact position by the inputting object has been dragged beyond the movement-allowed area 137. In FIG. 10(c), the lower left of the display unit 113 is set as the movement-allowed area 137 with consideration given to the arrangement of the virtual operation button A133 and virtual operation button B134 and the contactable range of the left thumb to be used as an inputting object. Since the contact position C1 has moved beyond the movement-allowed area 137, the display position of the virtual joystick 131 is brought to a stop on the boundary of the movement-allowed area 137 set in the lower left of the display unit 113.

Switching the display mode of the virtual operation keys together with switching the display mode of the display unit 113 on the basis of the output of the acceleration sensor 122 makes it possible to provide a greater variety of operation methods to a user.

In the embodiment described above, the virtual joystick 131 and the operative object 135 were semitransparently displayed, but in the present embodiment, the display areas thereof and the display areas of the movable object 132 and the like are set as separate display areas, and the virtual joystick 131 and the operative object 135 are therefore not necessarily required to be semitransparently displayed.

3. Control when the Terminal Device 100 is Connected to an External Display Device 200

Described in the embodiment described above was the case in which a display object, which may change at any time together with the progress of the program, is displayed on the display unit 113 of the terminal device 100, but it is also possible to connect to a liquid-crystal television or other external display device and display the display object and other image information, which may change at any time together with the progress of the program, on an external display device.

Figure 11:
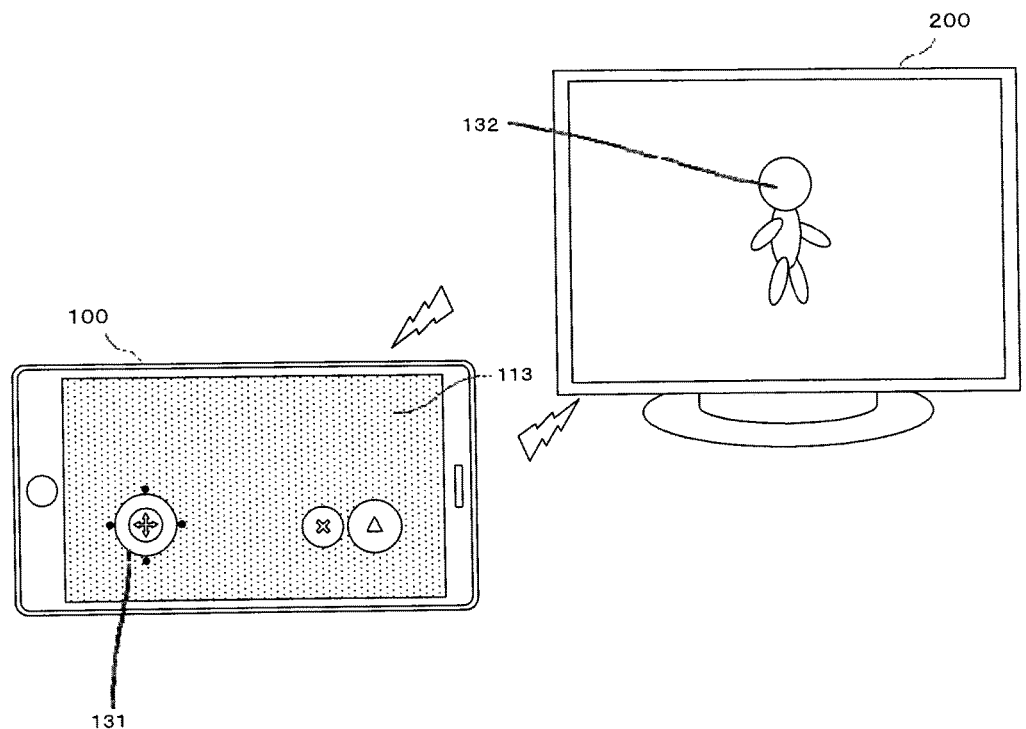
FIG. 11 is a schematic view of a screen example of when the terminal device 100 is connected to the external display device 200.

FIG. 11 is a schematic view of a screen example of when the terminal device 100 is connected to the external display device 200. According to FIG. 11, the terminal device 100 is connected to an external display device 200 by way of a wireless connection, and the display object or other image information, which may change at any time together with the progress of the program, is outputted. This connection may use a wireless LAN or a scheme related to narrowband wireless compunction such as Bluetooth (registered trademark) by way of a wireless communication processing unit 111. It is also possible to use a wired connection that makes use of HDMI (registered trademark) or the like via a connector 124 provided to the terminal device 100.

Referring to FIG. 11, virtual operation keys that include the virtual joystick 131 are displayed on the display unit 113 of the terminal device 100, and display objects that include the movable object 132 and vary as the game progresses are displayed on the external display device 200. Display control of the movable object 132 in which the virtual joystick 131 is used and tracking control for the virtual joystick 131 are the same as in the embodiment described above.

Using such a configuration make it possible to use the terminal device 100 as a controller dedicated to operation and to provide the user with a more realistic feeling.

In the embodiment described above, the virtual joystick 131 and the operative object 135 are semitransparently displayed, but in the present embodiment, the display areas thereof and the display areas of the movable object 132 and the like are set as separate display areas, and the virtual joystick 131 and the operative object 135 are therefore not necessarily required to be semitransparently displayed.

4. Other Examples of Virtual Operation Keys

Described in the embodiment above is a case where the virtual joystick 131 is used as a virtual operation key. However, virtual operation keys in which the present invention can be applied are not limited to the virtual joystick 131. For example, the present invention may be applied to a virtual operation key in which contact must be continuously made for fixed period of time or greater.

Figure 12:
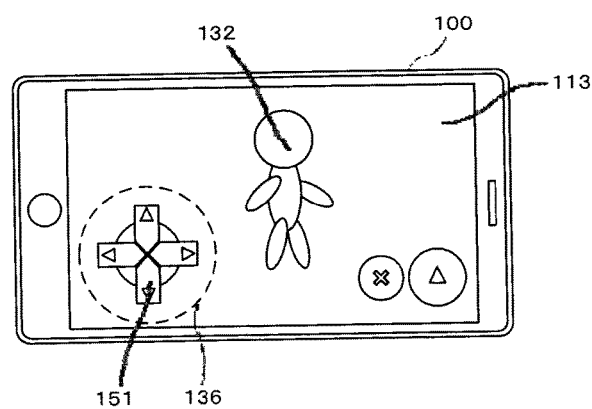
FIG. 12 is a schematic view of a screen example of when a virtual directional pad is used as the virtual operation key.

FIG. 12 is a schematic view of a screen example of when a virtual directional pad is used as the virtual operation key. Referring to FIG. 12, a virtual directional pad 151 is displayed on the display unit 113 of the terminal device 100 in a predetermined position. The user can control the movement of the movable object 132 by making contact with the virtual operation key in the four directions of up, down, left, and right as provided by the virtual directional pad 151.

In the case of the virtual directional pad 151, the user must more meticulously operate the inputting object because there is a plurality of more detailed virtual keys in comparison with the virtual joystick 131. Naturally, it is therefore possible to start tracking control for the virtual directional pad 151 when the contact position of the inputting object exceeds the display area of the individual virtual operation keys constituting the virtual directional pad 151. However, it is more desirable for the operation detection area 136 having a greater display area than the virtual directional pad 151 to be set and tracking control for the virtual directional pad 151 to be carried out on the basis of the operation detection area 136.

Figure 13:
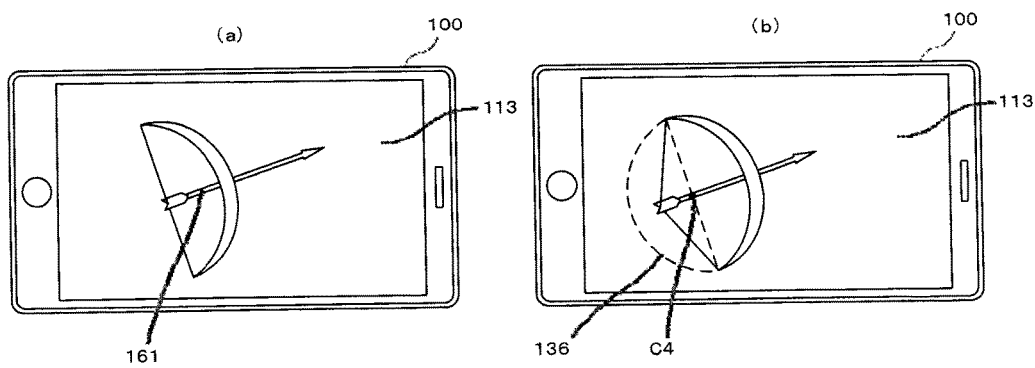
FIG. 13 is a schematic view of a screen example of when a key imitating a bow and arrow is used as the virtual operation key.

FIG. 13 is a schematic view of a screen example of when a key imitating a bow and arrow is used as the virtual operation key. Described in the embodiment described above is the case in which the virtual joystick 131 is used as a virtual operation key. In other words, the case in which the virtual operation key is formed by a circle and the center of the circle is set as a reference position was described. However, the reference position is not limited to being the center or median point of the virtual operation key, and any position may be set as the reference position.

Referring to FIG. 13, a virtual operation key 161 imitating a bow and arrow is displayed. The user performs an operation so as to draw the bow of the virtual operation key 161, i.e., make contact on the arrow using the inputting object, drags the virtual operation key in a predetermined direction while the inputting object is kept in contact with the virtual operation key, and the releases contact, whereupon the control unit 110 controls display so that an arrow flies through virtual space. In such a case, the reference position serving as a reference for determining the direction and distance of the contact position can be set, as appropriate, in any position C4. As for the area serving as a reference for determining whether to perform tracking control for the virtual operation key 161, any area can be set as the operation detection area 136 rather than the display area of the virtual operation key 161.

Using such a configuration makes it possible to express a greater variety of virtual operation keys.

The processing and procedures described in the present embodiment can be implemented not only by the configuration explicitly described above in the embodiments, but also by software, hardware, or combinations thereof. Specifically, the processing and procedures described in the present specification can be implemented by mounting logic corresponding to the processing in integrated circuitry, volatile memory, nonvolatile memory, a magnetic disk, optical storage, or other medium. Also, the processing and procedures described in the present specification can be mounted as a computer program and the processing and procedures can be executed in various types of computers.

It has been described that the processing and procedures described in the present specification are executed in a single device, software unit, component, and module, but such processing and procedures may be executed by a plurality of devices, a plurality of software units, a plurality of components, and/or a plurality of modules. Also, it has been described that the data, table, or database described in the present specification is stored in a single memory, but such data, table, or database may be stored in a plurality of memories provided to a single device or dispersively stored in a plurality of memories dispersively disposed in a plurality of devices. The software and hardware elements described in the present specification can be consolidated in a smaller number of constituent elements or distributed among a higher number of constituent elements.

KEY

100 Terminal device
110 Control unit
113 Display unit
116 Touch panel
200 External display device

The invention claimed is:

1. A terminal device comprising:
a memory that includes computer-readable instructions;
a display that is divided into first and second adjacent display areas and that is configured to display a virtual operation key, the display being configured to display a predetermined movable object which is continuously movable in the first and second display areas;
a touch panel that is provided directly adjacent to the display and that is configured to detect contact by an inputting object on the virtual operation key; and
a processor that is configured to execute the computer-readable instructions to:
 assess a drag operation by the inputting object based on the contact with the virtual operation key by the inputting object;
 control movement of the predetermined movable object according to the drag operation; and
 selectively move the virtual operation key in the display based on the drag operation,
wherein an operation detection area is defined on the touch panel relative to the virtual operation key, and the virtual operation key is located in the operation detection area,
wherein the processor is further configured to:
 maintain a display position of the virtual operation key at a current location when a contact position of the inputting object on the touch panel is anywhere within the operation detection area so that even when the contact position in the operation detection area is misaligned with the virtual operation key, the virtual operation key is kept stationary at the current location;
 move the display position of the virtual operation key to a new location when the contact position of the inputting object on the touch panel is outside of the operation detection area, the new location corresponding to the contact position; and
 restrict the display position of the virtual operation key to a virtual key display area that is located only in the first display area when the drag operation continuously moves from the first display area and crosses over into the second display area so that the virtual operation key does not cross over into the second display area,
wherein, when the drag operation continuously moves from the first display area and crosses over into the second display area, the processor is configured to move the predetermined movable object from the first display are and cross over into the second display area,
wherein, at a display area interface uninterruptedly transitioning the first display area directly to the second display area, a boundary of the first display area is coextensive with a boundary of the second display area, and
an edge of the virtual key display area is aligned with the display area interface.

2. The terminal device according to claim 1,
wherein the operation detection area is larger than the virtual operation key, and
the virtual operation key is completely located within the operation detection area.

3. The terminal device according to claim 1,
wherein the processor is configured to determine a movement direction of the predetermined movable object based on a predetermined reference position and a direction obtained based on a locational relationship between the contact position of the inputting object and the predetermined reference position.

4. The terminal device according to claim 1,
wherein the processor is configured to determine a movement distance of the predetermined movable object based on a distance between a predetermined reference position and the contact position of the inputting object.

5. The terminal device according to claim 3, wherein the predetermined reference position is located in the operation detection area in which the processor is configured to detect an operation of the virtual operation key by the inputting object, and
when the contact position of the inputting object is outside of the operation detection area due to the drag operation, the processor is configured to determine the movement direction and a movement distance of the predetermined movable object based on a distance between the predetermined reference position and a position at which a line connecting the predetermined reference position and the contact position intersects an outer periphery of a display area of the virtual operation key.

6. The terminal device according to claim 1, wherein the processor is configured to display the virtual operation key at an area in the first display area directly adjacent to the display area interface when the inputting object is contacted to the second display area.

7. The terminal device according to claim 6, wherein the processor is configured to display the virtual operation key in a fixed position set in advance prior to detection of the drag operation on the virtual operation key.

8. The terminal device according to claim 7, wherein the display is divided into a left area and a right area along a centerline of the display, and the fixed position is located in the left area corresponding to the first display area.

9. The terminal device according to claim 7, wherein the processor is configured to display the virtual operation key in the fixed position, and
the processor is configured to detect contact on any position of the touch panel in the first display area by the inputting object, and the processor is configured to move the virtual operation key to a position of the contact by the inputting object.

10. The terminal device according to claim 3, wherein the virtual operation key is circular, and
the predetermined reference position is located at a center of the circular virtual operation key.

11. The terminal device according to claim 10, wherein the processor is configured to display an operative object showing the contact position of the inputting object, and
the processor is configured to modify a display position of the operative object in accordance with movement of the contact position.

12. The terminal device according to claim 11, wherein the operative object is circular, and
when the contact position of the inputting object is located in the second display area due to the drag operation, the processor is configured to control the display position of the virtual operation key so that a center of the circular operative object is positioned outside the circular virtual operation key.

13. The terminal device according to claim 1, wherein the virtual operation key is semitransparently displayed.

14. The terminal device according to claim 1, wherein the virtual operation key is a virtual joystick, which virtually imitates a joystick.

15. A computer program product embodying computer readable instructions stored on a non-transitory computer-readable medium for causing a computer to execute the computer readable instructions by a processor so as to perform the steps of:
displaying a virtual operation key on a display, the display being divided into first and second adjacent display areas;
displaying a predetermined movable object which is continuously movable in the first and second display areas on the display;
causing a touch panel to detect contact by an inputting object on the virtual operation key;
assessing a drag operation by the inputting object based on the contact with the virtual operation key by the inputting object;
control movement of the predetermined movable object according to the drag operation; and
selectively moving the virtual operation key in the display based on the drag operation,
wherein an operation detection area is defined on the touch panel relative to the virtual operation key, and the virtual operation key is located in the operation detection area,
wherein the processor is further configured to:
maintain a display position of the virtual operation key in a current location when a contact position of the inputting object on the touch panel is anywhere within the operation detection area so that even when the contact position in the operation detection area is misaligned with the virtual operation key, the virtual operation key is kept stationary at the current location;
move the display position of the virtual operation key to a new location when the contact position of the inputting object on the touch panel is outside of the operation detection area, the new location corresponding to the contact position; and
restrict the display position of the virtual operation key to a virtual key display area that is located only in the first display area when the drag operation continuously moves from the first display area and crosses over into the second display area so that the virtual operation key does not cross over into the second display area, wherein when the drag operation continuously moves from the first display area and crosses over into the second display area, the processor is configured to move the predetermined movable object from the first display area and cross over into the second display area,
wherein, at a display area interface uninterruptedly transitioning the first display area directly to the second display area, a boundary of the first display area is coextensive with a boundary of the second display are, and
an edge of the virtual key display area is aligned with the display area interface.

16. A method for causing a processor to execute a process, the method comprising executing on the processor the steps of:
displaying a virtual operation key on a display, the display being divided into first and second adjacent display areas;
displaying a predetermined movable object which is continuously movable in the first and second display areas on the display;
causing a touch panel to detect contact by an inputting object on the virtual operation key;
assessing a drag operation by the inputting object by the contact with the virtual operation key by the inputting object;
control movement of the predetermined movable object according to the drag operation; and
selectively moving the virtual operation key in the display based on the drag operation,
wherein an operation detection area is defined on the touch panel relative to the virtual operation key, and the virtual operation key is located in the operation detection area,
wherein the processor is further configured to:
maintain a display position of the virtual operation key in a current location when a contact position of the inputting object on the touch panel is anywhere within the operation detection area so that even when the contact position in the operation detection area is misaligned with the virtual operation key, the virtual operation key is kept stationary at the current location;
move the display position of the virtual operation key to a new location when the contact position of the inputting object on the touch panel is outside of the operation detection area, the new location corresponding to the contact position; and
restrict the display position of the virtual operation key to a virtual key display area that is located only in the first display area when the drag operation continuously moves from the first display area and crosses over into the second display area so that the virtual operation key does not cross over into the second display area, wherein when the drag operation continuously moves from the first display area and crosses over into the second display area, the processor is configured to move the predetermined movable object from the first display area and cross over into the second display area,
wherein, at a display area interface uninterruptedly transitioning the first display area directly to the second display area, a boundary of the first display area is coextensive with a boundary of the second display area, and
an edge of the virtual key display area is aligned with the display area interface.

17. The computer program product according to claim 15, wherein the processor is configured to determine a movement direction of the predetermined movable object based on a predetermined reference position and a direction obtained based on a locational relationship between the contact position of the inputting object and the predetermined reference position.

18. The computer program product according to claim 15, wherein the processor is configured to determine a movement distance of the predetermined movable object based on a distance between a predetermined reference position and the contact position of the inputting object.

19. The method according to claim 16, wherein the processor is configured to determine a movement direction of the predetermined movable object based on a predetermined reference position and a direction obtained based on a locational relationship between the contact position of the inputting object and the predetermined reference position.

20. The method according to claim 16, wherein the processor is configured to determine a movement distance of the predetermined movable object based on a distance between a predetermined reference position and the contact position of the inputting object.

* * * * *